United States Patent Office

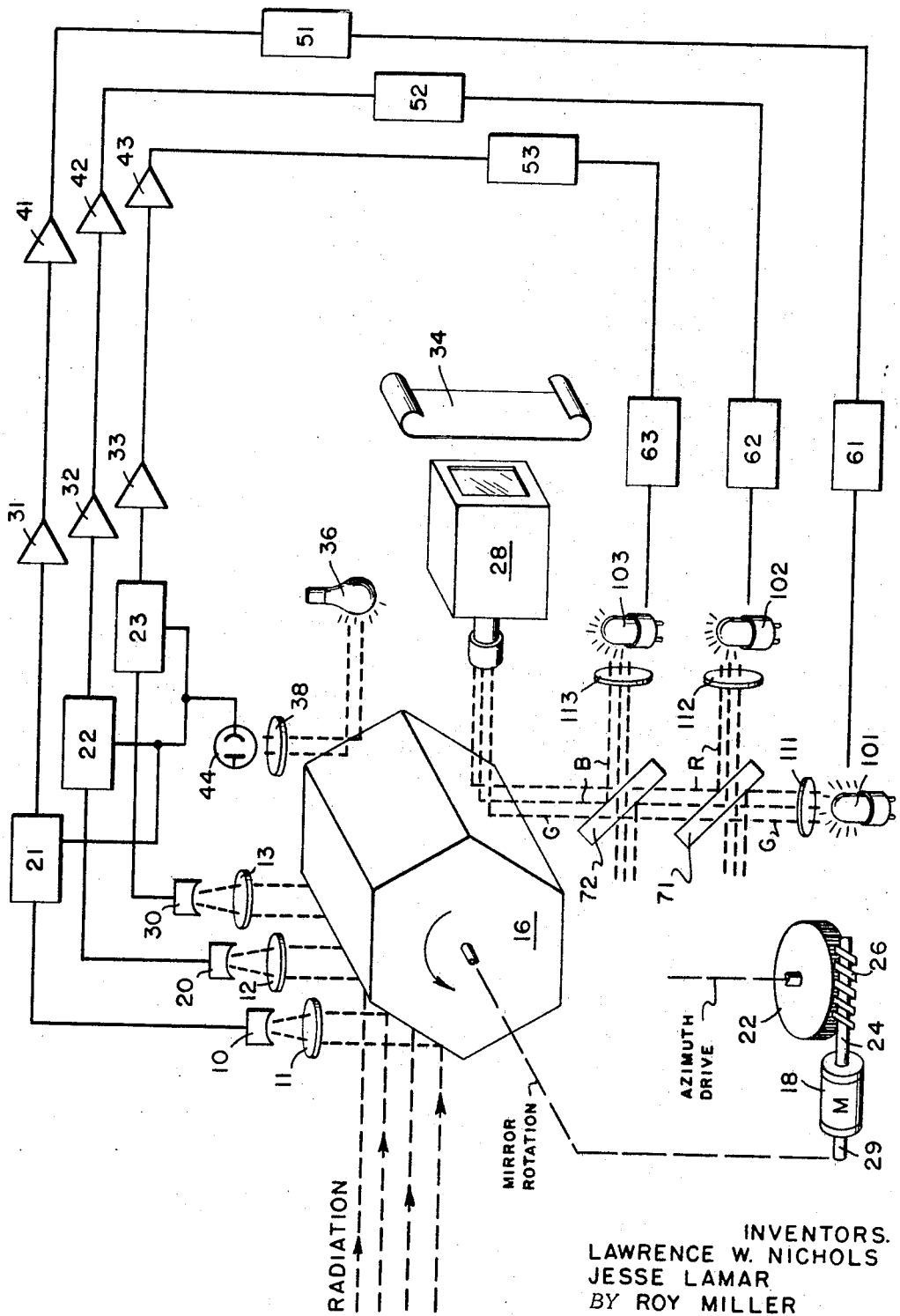

3,508,051
Patented Apr. 21, 1970

3,508,051
EMPLOYING A PLURALITY OF DICHROIC MIRRORS TO PRODUCE A THREE-COLOR IMAGE
Lawrence W. Nichols and Jesse Lamar, China Lake, Calif., assignors to the United States of America as represented by the Secretary of the Navy
Filed July 20, 1967, Ser. No. 655,722
Int. Cl. H01j 39/00
U.S. Cl. 250—65
4 Claims

ABSTRACT OF THE DISCLOSURE

A system is provided for detecting and converting infrared signals to produce color in the visible spectrum and produce therefrom a three color photograph. Three narrow bands in the infrared spectrum are converted to the three primary colors and imaged on color film. The system utilizes a rotating mirror which scans in elevation and in azimuth to reflect infrared onto IR detectors which produce a current which is utilized to modulate glow tubes. The glow tube outputs are white light which is partially reflected and partially passed through dichroic mirrors to produce red, blue and green visible light which is then recorded on color film. The resultant color record represent the infrared pickup in a complete three color photograph.

GOVERNMENT INTEREST

The invention described herein may be manufactured and used by or for the Government of the United States of America for governmental purposes without the payment of any royalties thereon or therefor.

BACKGROUUND OF THE INVENTION

It has long been known that objects could be detected by interception of infrared radiation reflected and/or emitted by the objects. Different objects, of course, emit different patterns of infrared radiation and recognition of these patterns may be utilized in the detection and identification of the object or objects. While detectors have been provided in the prior art for determining the amount of infrared radiation emanating from a target, these detectors, for the most part, have not been capable of producing a three color photograph.

Some attempts have been made to produce visible color images from received signals in the infrared spectrum and one such device is disclosed in United States Patent No. 2,848,626, patented Aug. 19, 1958 to William J. Brackmann.

SUMMARY OF THE INVENTION

The present invention provides a device for converting three spectral bands in the infrared range to three primary colors of the visual spectrum and displaying or recording the resulting pattern for inspection. A feature of the present invention is the use of a rotating prism, the mirrored sides of which are used for synchronization of the received IR and the projected visible light radiation. According to the invention, electrical signals are produced which are indicative of the IR signals received. These electric signals are impressed upon three glow tubes and the light rays from these tubes are then passed through an optical system comprising distinctive dichroic mirrors to separate the three primary colors which are then combined and projected upon a photographic film, for example.

BRIEF DESCRIPTION OF THE DRAWING

The single figure of the drawing is a diagrammatic representation in block diagram form of an infrared detection system according to the invention.

DETAILED DESCRIPTION OF THE INVENTION

In the drawing there is illustrated a novel IR detection and recording device comprising the major components shown individually. Thus, there are three lenses, three preamplifiers and three video amplifiers, for example. However, if desired, some of the components which are represented as being in multiple may be replaced with single units common to all three circuits. For example, a single lens may be employed to focus the received infrared radiation onto the IR detectors.

Referring now to the details of the drawing there is shown an IR detector system comprising a prismatic mirror 16 which is rotated and driven in azimuth by a drive motor 18 and gears 22, 26. As shown, the mirror may be rotated directly by shaft 29 while the properly timed azimuth precession is produced by means of a worm 26 and a worm wheel 22 driven by shaft 24. When the system is oriented toward a source of infrared radiation, the infrared rays impinge on the respective faces of the rotating mirror and are focused by lenses 11, 12, 13 onto three distinctive IR detectors 10, 20, 30. The signals generated by the IR detectors are then selectively passed through photoelectrically synchronized video gates 21, 22, 23 and preamplified at 31, 32, 33. The outputs from the preamplifiers are supplied to video amplifiers 41, 42, 43 respectively. The outputs of the respective video amplifiers are then passed through automatic gain controls 51, 52, 53 and power amplifiers 61, 62, 63. The video gates are triggered by synchronization pulses derived from a photocell 44 which is synchronously pulsed by light reflected from a face of the rotating mirror 16. The sync pulse lamp is shown at 36 and is so placed that light therefrom will impinge on a face of the rotating mirror and be reflected in proper timed relationship through lens 38 upon photocell 44. The video signals from the video gates, after passing through the power amplifiers 61, 62, 63, are used to modulate glow lamps 101, 102, 103. The modulated outputs from the three individual glow lamps are collimated by lenses 111, 112, 113 and passed through dichroic mirrors 71, 72 as shown. The output of the glow tubes is white light and the mirror 71 is designed to reflect red and pass blue and green, and mirror 72 is designed to reflect blue and pass red and green. In other words, the output from the final dichroic is modulated blue, red and green light. The output light is reflected from a face of the rotating mirror and focused onto film 34 by camera 28. It should be noted that the light output from the dichroic mirror system contains a green component from lamp 101 only, a red component from lamp 102 only and a blue component from lamp 103 only. Thus, the resulting picture is a color representation of the infrared radiation input which is normally invisible to the human eye.

CONCLUSION

From the foregoing, it will appear obvious that an infrared detection system has been provided which will enable identification and analysis of objects through the medium of a three-color photograph representative of the infrared signals received by the detector.

Obviously many modifications and variations of the present invention are possible in the light of the above teachings. It is therefore to be understood that within the scope of the appended claims the invention may be practiced otherwise than as specifically described.

What is claimed is:
1. Phototechnic radiometer apparatus comprising in combination:
    scanning means for receiving radiation in a precontrived pulsed sequence;
    radiation sensing means comprising three distinctive receptors, each sensitive to a select portion of the radiation spectrum and adapted to produce output signals proportional to the radiation received;

one light emitting element operatively connected to each of said receptors and adapted to emit visible light relative to the received radiation when said output signal of the respective receptor is applied to the element;

dichroic mirror means so constructed and arranged with respect to said light emitting elements that one only of the primary colors red, green and blue is furnished by each element and combined to constitute a final multicolor beam; and recording means for producing a multicolor image from said final beam.

2. Radiometer apparatus according to claim 1 wherein the color filter means consists of;

one dichroic mirror which transmits blue and green but reflects red and another dichroic mirror which transmits red and green but reflects blue.

3. Radiometer apparatus according to claim 2 wherein the scanning means comprises:

a rotatable prism;

means for revolving said prism; and means for azimuthally moving the prism in timed relationship to the revolution thereof.

4. Radiometer apparatus according to claim 1 wherein the scanning means comprises a rotatable prism; and means for rotating said prism while simultaneously effecting an orderly progression of the prism azimuthally.

References Cited

UNITED STATES PATENTS

| | | | |
|---|---|---|---|
| 2,848,626 | 8/1958 | Brackmann | 250—83.3 |
| 2,971,093 | 2/1961 | Garbuny | 250—83.3 |
| 3,130,308 | 4/1964 | Astheimer | 250—83.3 |
| 3,278,746 | 10/1966 | Fiat | 250—83.3 |
| 3,287,559 | 11/1966 | Barnes | 250—83.3 |

RALPH G. NILSON, Primary Examiner

C. E. CHURCH, Assistant Examiner

U.S. Cl. X.R.

250—83.3